United States Patent
Bowen et al.

(10) Patent No.: US 9,109,664 B2
(45) Date of Patent: Aug. 18, 2015

(54) RANGE SHIFT SYSTEM FOR TRANSFER CASE

(71) Applicant: HYUNDAI WIA CORPORATION, Gyeongsangnam-do (KR)

(72) Inventors: Thomas C. Bowen, Rochester Hills, MI (US); Nam Huh, Gyeonggi-do (KR); Jeong Yong Yun, Gyeonggi-do (KR); Il Hun Ryu, Gyeonggi-do (KR)

(73) Assignee: HYUNDAI WIA CORPORATION, Gyeongsangnam-do (KR)

( * ) Notice: Subject to any disclaimer, the term of this patent is extended or adjusted under 35 U.S.C. 154(b) by 0 days.

(21) Appl. No.: 14/142,358

(22) Filed: Dec. 27, 2013

(65) Prior Publication Data

US 2014/0187377 A1 Jul. 3, 2014

(30) Foreign Application Priority Data

Dec. 28, 2012 (KR) .................. 10-2012-0156090

(51) Int. Cl.
*F16H 3/44* (2006.01)
*B60K 17/344* (2006.01)
*B60K 17/346* (2006.01)
*B60K 17/348* (2006.01)
*B60K 23/08* (2006.01)

(52) U.S. Cl.
CPC .............. *F16H 3/44* (2013.01); *B60K 17/344* (2013.01); *B60K 17/346* (2013.01); *B60K 17/348* (2013.01); *B60K 17/3462* (2013.01); *B60K 17/3465* (2013.01); *B60K 17/3467* (2013.01); *B60K 2023/085* (2013.01); *B60K 2023/0816* (2013.01)

(58) Field of Classification Search
CPC ............... B60K 17/344; B60K 17/346; B60K 17/3462; B60K 17/3465; B60K 2023/0816; B60K 2023/0841; B60K 2023/085
USPC ......... 475/198, 206, 220, 334, 298, 299, 320; 180/233, 240, 249; 74/665 F, 665 G, 74/665 GA; 173/216
See application file for complete search history.

(56) References Cited

U.S. PATENT DOCUMENTS

| | | | | |
|---|---|---|---|---|
| 5,584,776 A * | 12/1996 | Weilant et al. | ................ | 475/213 |
| 5,609,540 A * | 3/1997 | Brissenden et al. | .......... | 475/202 |
| 5,613,587 A * | 3/1997 | Baxter, Jr. | .................. | 192/53.32 |
| 5,704,867 A * | 1/1998 | Bowen | .......................... | 475/221 |
| 5,853,342 A * | 12/1998 | Pritchard et al. | .............. | 475/206 |
| 5,916,052 A * | 6/1999 | Dick | ............................. | 475/198 |
| 6,142,905 A * | 11/2000 | Brown et al. | ................ | 475/206 |
| 6,579,205 B2 * | 6/2003 | Williams | ....................... | 475/204 |
| 6,616,571 B2 * | 9/2003 | Kigoshi | .......................... | 477/36 |
| 6,837,819 B2 * | 1/2005 | Foster | ............................ | 475/210 |
| 2004/0157698 A1 * | 8/2004 | Hara et al. | ..................... | 475/298 |
| 2012/0142478 A1 * | 6/2012 | Scheffel et al. | .............. | 475/198 |

* cited by examiner

Primary Examiner — Robert Hodge
Assistant Examiner — Tinh Dang

(57) ABSTRACT

Disclosed is a range shift mechanism in the form of a floating planetary gear assembly for a transfer case. The range shift mechanical according to the present invention can improve power efficiency and generate low noises by suppressing gear rotation in a high range mode of the range shift system.

16 Claims, 5 Drawing Sheets

RANGE SHIFT SYSTEM FOR TRANSFER CASE

CROSS-REFERENCE TO RELATED APPLICATION

This application claims priority to and the benefit of Korean Patent Application No. 10-2012-0156090 filed on Dec. 28, 2012, which is herein incorporated by reference in its entirety.

BACKGROUND OF THE INVENTION

1. Field of the Invention

The present invention relates to a transfer case for transferring a drive torque to a front axle in an all-wheel driving system for a rear wheel driving vehicle. More particularly, the present invention relates to a range shift mechanism in the form of a planetary gear assembly system shifting the speed between a high range and a low range in a transfer case.

2. Description of the Related Art

A conventional transfer case, for example, the transfer case disclosed in U.S. Pat. Nos. 7,399,251 and 6,616,571, is a device of a 4-wheel or all-wheel driving system for a rear wheel driving vehicle. The transfer case receives a driving force from a transmission and transfers the driving force to a front axle and a rear axle. The transfer case supports two types of range shift mechanisms, that is, a mode shift mechanism and a range shift mechanism.

FIG. 1 is a schematic diagram illustrating a driveline of a general 4-wheel driving vehicle including a transfer case 100.

In a rear wheel driving vehicle, the driving force of an engine 1 is transferred to a rear wheel R through a transmission 2, a rear wheel driving shaft 3 and a rear axle assembly 5. In order to establish a 4-wheel or all-wheel system, the transfer case 100 is installed between the transmission 2 and the rear wheel driving shaft 3. In addition, the transfer case 100 distributes the driving force to a front wheel F through the front axle assembly 4.

The transfer case 100 includes a mode shift mechanism 110 and a range shift mechanism 120. The mode shift mechanism 110 of the transfer case 100 provides shifting between the 2-wheel driving mode and a 4-wheel driving mode, and the range shift mechanism 120 provides shifting between a high range mode and a low range mode.

The high range mode is selected to ensure safe running by increasing a ground contact force through uniform power distribution of 25% for each of front and rear wheels to prevent slips or tire damages due to excessive power of 50% transferred to the rear wheels on an unpaved road or a road in a bad condition. During normally running, even when the road condition is bad due to snow or rain, highly efficient driving can be delivered. In the high range mode, the driving speed is constant relative to a transmission speed in a two-wheel drive mode (average gear ratio of 1:1).

The low range mode is selected to ensure maximum traction force and high speed running. In the low range mode, high driving performance is demonstrated in running on the road of a steep slope or in pulling a vehicle. In particular, the low range mode allows excellent escape performance on an unpaved road in a severely adverse condition (a muddy road, a creviced road, a road with a side slope, a road with a steep slope, etc.). In the low range mode, the driving speed has a high reduction ratio relative to a transmission speed in a two-wheel drive mode (average gear ratio of around 1:2).

FIG. 2 is a cross-sectional view of a general range shift mechanism 120 including the transfer case 100 shown in FIG. 1.

The range shift mechanism 120 includes a planetary gear assembly system 130, and the planetary gear assembly system 130 includes a sun gear 131, a pinion gear 132, a ring gear 133 and a carrier 135.

In the general range shift mechanism 120, the ring gear 133 is fixed to the housing 121, and the sun gear 131 and the pinion gear 132 rotate within the ring gear 133 that is fixed all the time for power transfer. Here, undefined reference numeral "141" denotes a sleeve connected to a shift lever.

The mode shift mechanism allows a driver to shift the drive mode from a "2-wheel drive mode" to "4-wheel drive mode" while the range shift mechanism 120 allows shifting between a "high range mode" and a "low range mode".

The range shift mechanism 120 typically includes a planetary gear assembly system 130. In the high range mode, the sun gear 131 is connected to an output shaft OP, and speed reduction occurs in the planetary gear assembly system 130. The low range mode is employed only under a low-speed condition or a heavily loaded condition, for example, such a case of pulling of a heavy load or driving on an unpaved road. The percentage of using the low range mode is 1% or less.

In the general range shift mechanism 120, the ring gear 133 is fixed to the housing 121, and continuous gear rotation occurs all the time between the sun gear 131, the pinion gear 132 and the ring gear 133. In the high range mode used by 99% or greater in the general range shift mechanism 120, speed reduction by the planetary gear assembly system 130 is not required. In the high range mode in which the sun gear 131 is directly connected to the output shaft OP, the pinion gear 132 rotates between the sun gear 131 and the ring gear 133. Such gear rotation causes a loss in the power and gear noises.

SUMMARY OF THE INVENTION

In order to overcome the above-mentioned shortcomings, the present invention provides improvement of the power efficiency of a range shift mechanism by suppressing gear rotation in the high range mode, which is the most part of the use by the range shift mechanism and a solution to a problem with noise generation.

According to an aspect of the invention, there is provided a range shift mechanism including an input shaft providing a driving force to a sun gear, an output shaft arranged coaxially with the input shaft and rotating independently of the input shaft, a sun gear having a clutch gear at its one side portion to be connected with a carrier and integrated with the input shaft, a carrier arranged coaxially with the sun gear, directly connected to the output shaft and having a clutch gear at its one side portion to be to be connected with the sun gear, a plurality of pinion gears radially installed on the carrier and meshed with the sun gear and a ring gear, a floating ring gear arranged coaxially with the output shaft, freely rotating on the output shaft in a coaxial direction and having a clutch gear at its one side portion to be connected with a housing, a sleeve having a clutch gear to be connected with the sun gear, the ring gear and a housing clutch gear, axially sliding on the input shaft by a fork and having a circumferential groove to be connected with the fork, and a fork and a guide rail axially moving the sleeve.

The planetary gear assembly system may have a low range mode in which a gear ratio is 1.4:1 to 4.5:1.

The floating ring gear may be capable of freely rotating axially on the output shaft, fixed to the input shaft and the output shaft in a high range mode and fixed to the housing in a low range mode.

The sleeve may control connections between each of the sun gear, the ring gear and the housing, in the high range mode, the clutch gear installed on the sleeve may connect the clutch gear installed on the sun gear and the clutch gear installed on the carrier, the planetary gear assembly system, including the sun gear, the pinion gears, the pinion shaft and the ring gear, may be integrated into one single unit and rotate together, and in the low range mode, the clutch gear installed on the sleeve connects the housing clutch gear and the clutch gear installed on the ring gear, and ring gear rotation may not occur in a fixed state.

The carrier may be connected to the output shaft and may include a clutch carrier on its one side portion to enable smooth connection with the sun gear by the sleeve.

The sun gear may include a clutch gear on its one side portion to enable smooth connection with the carrier by the sleeve.

The housing clutch gear may be fixed to the housing to enable smooth connection with the ring gear by the sleeve in the low range mode.

Additional aspects and/or advantages of the invention will be set forth in part in the description which follows and, in part, will be obvious from the description, or may be learned by practice of the invention.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present disclosure will be described in detail with reference to the accompanying drawings in such a manner that the technical idea of the present disclosure may easily be carried out by a person with ordinary skill in the art to which the invention pertains. Objects, operations, effects, other objects, characteristics and advantages of the present disclosure will be easily understood from an explanation of a preferred embodiment that will be described in detail below by reference to the attached drawings.

Although embodiments have been described with reference to illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

Figure 3:
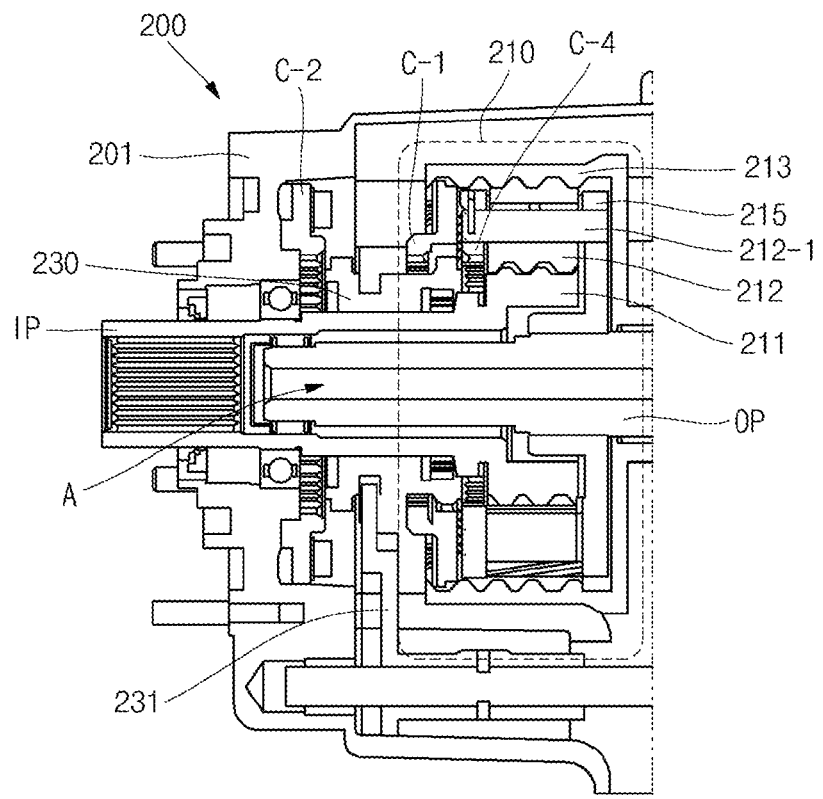
FIG. 3 illustrates an exemplary embodiment of a floating planetary range shift mechanism according to the present invention.

FIG. 3 illustrates an exemplary embodiment of a floating planetary range shift mechanism according to the present invention.

The range shift mechanism 200 according to the embodiment of the present invention includes a planetary gear assembly system 210. The planetary gear assembly system 210 includes a sun gear 211, a pinion gear 212, a ring gear 213 and a carrier 215. In particular, the planetary gear assembly system 210 further includes a first clutch C-1 installed in the ring gear 213. Here, undefined reference numeral "212-1" denotes a pinion gear shaft, and the pinion gear 212 is rotatably fixed to the carrier 215 through the pinion gear shaft 212-1.

The planetary gear assembly system 210 performs a function of shifting a speed ratio between an input shaft IP and an output shaft OP. The input shaft IP is directly connected to the sun gear 211 of the planetary gear assembly system 210, and the output shaft OP is connected to the carrier 215.

The ring gear 213 is of a floating type and may rotate with the input shaft IP and the output shaft OP. As compared with the general range shift mechanism 120 shown in FIG. 2, the most significant characteristic of the present invention is the structure of the ring gear 213.

The first clutch gear C-1 installed in the ring gear 213 is connected to the ring gear 213, and a second clutch gear C-2 is installed in the housing 201. Meanwhile, a third clutch gear C-3 is installed on the input shaft IP, and a fourth clutch gear C-4 is installed on the carrier 215.

In addition, a sleeve 230 is installed on a circumferential portion of the input shaft IP. The sleeve 230 slides on the input shaft IP and controls connections between each of the input shaft IP, the planetary gear assembly system 210 and the housing 201.

If the sleeve 230 moves on the input shaft IP to the right (of the drawing) in a high range mode by a fork 231 connected to a shift lever (not shown), the third clutch gear C-3 on the input shaft IP is connected to the fourth clutch gear C-4 on the carrier 215. Since the carrier 215 is directly connected to the output shaft OP, the input shaft IP is directly connected to the output shaft OP, with a gear ratio of 1:1.

Under these conditions, the planetary gear assembly system 210 including the ring gear 213 is one single unit and rotates together with shafts (IP and OP shafts). That is to say, there is no rotation of a gear meshed with another gear, leading to no loss in the power due to gear rotation. In addition, noises due to gear rotation are not generated, and supply of a lubricating oil is not coercively required.

Figure 4A:
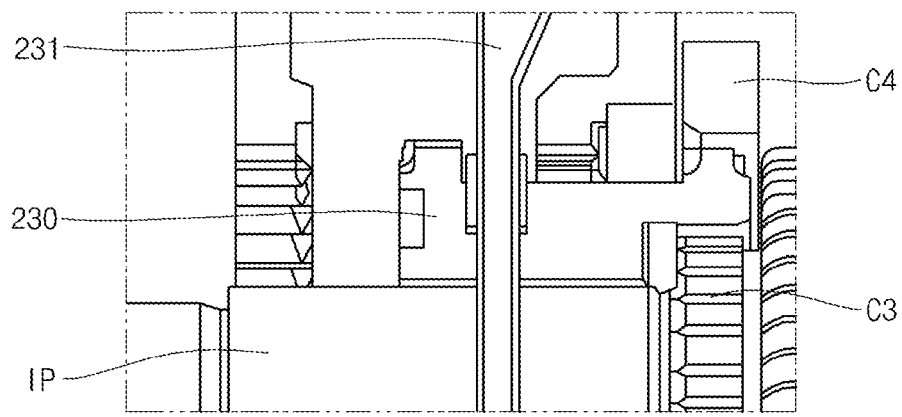
FIGS. 4A, 4B and 4C are detailed diagrams of a portion "A" of FIG. 3, specifically illustrating a relationship between a sleeve and a carrier in a high range mode in FIG. 4A, a position of a sleeve in a low range mode in FIG. 4B, and a position of a sleeve in a neutral range mode.
Figure 5:
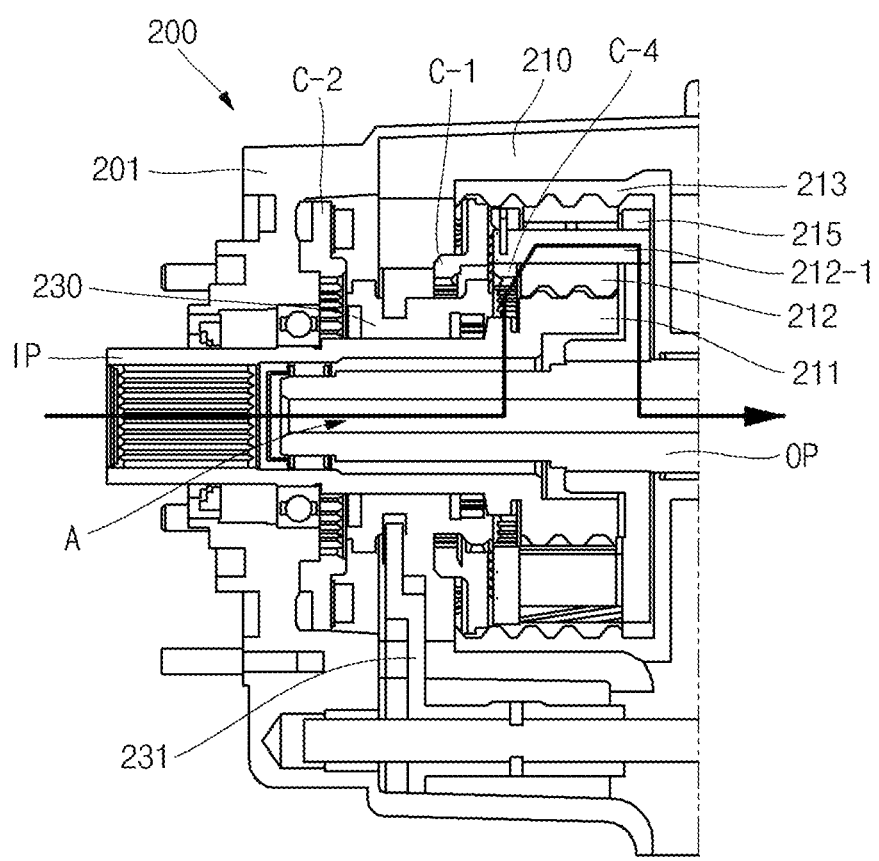
FIG. 5 illustrates the power transfer path in the high range mode according to the present invention shown in FIG. 4A.

The power transfer path, as indicated by the arrow, in the high range mode according to the present invention shown in FIG. 4A is illustrated in FIG. 5.

Figure 1:
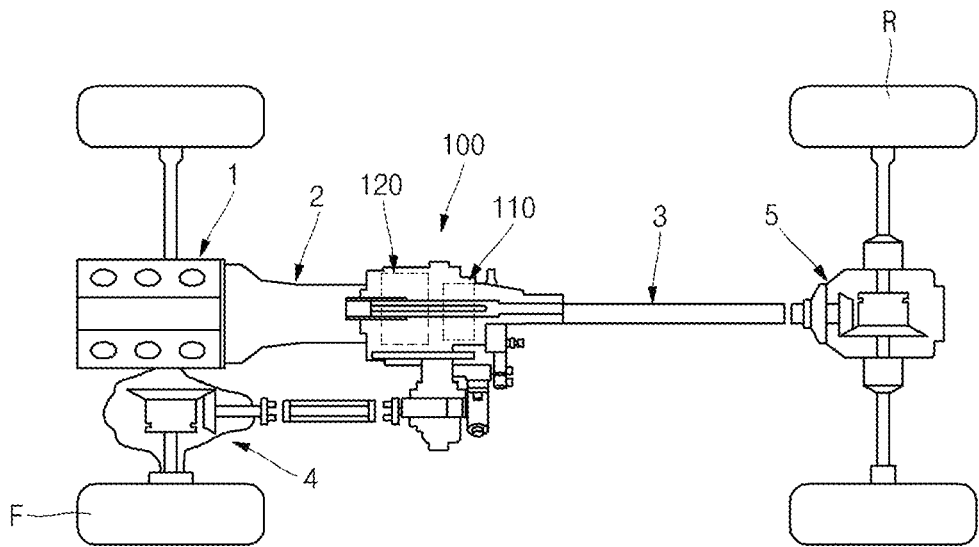
FIG. 1 is a schematic diagram illustrating a driveline of a general 4-wheel driving vehicle including a transfer case.
Figure 2:
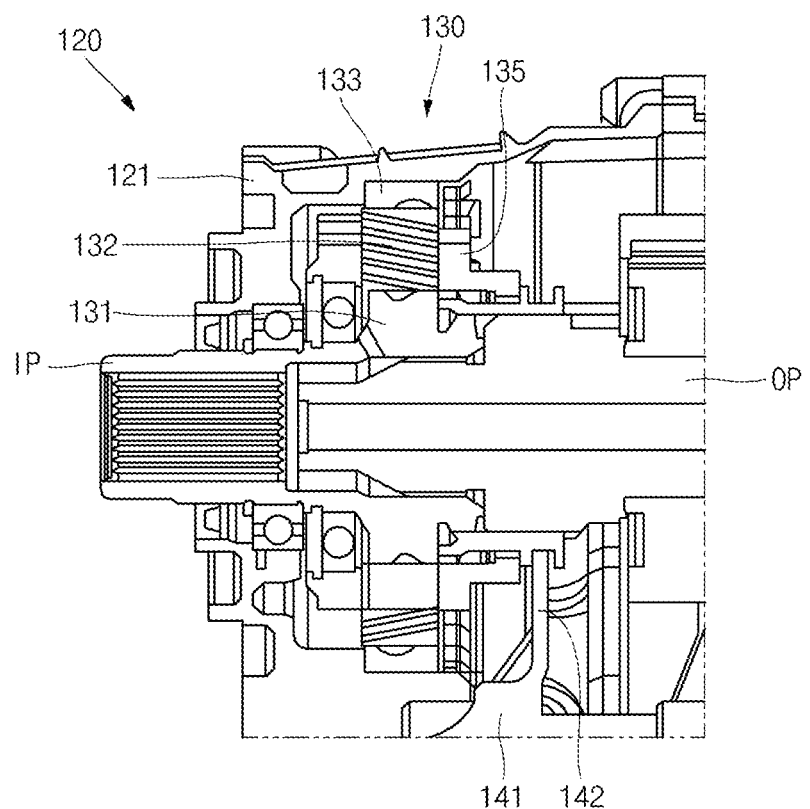
FIG. 2 is a cross-sectional view of a general range shift mechanism including the transfer case shown in FIG. 1.

As compared with the general range shift mechanism 120 shown in FIG. 2, the range shift mechanism 200 according to the present invention is highly efficient and generates a small amount of noises in the high range mode used by 99% or greater for the most part of operating time.

Figure 4B:
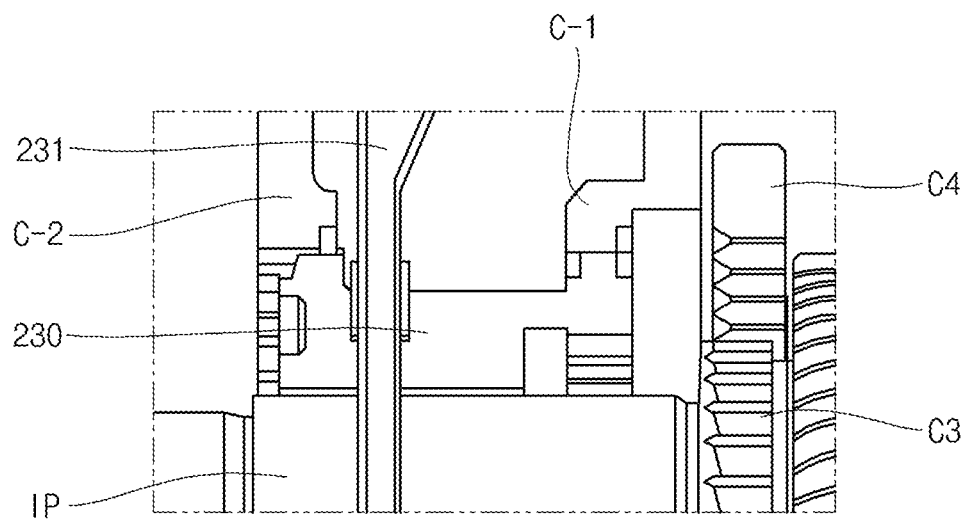
Figure 4C:
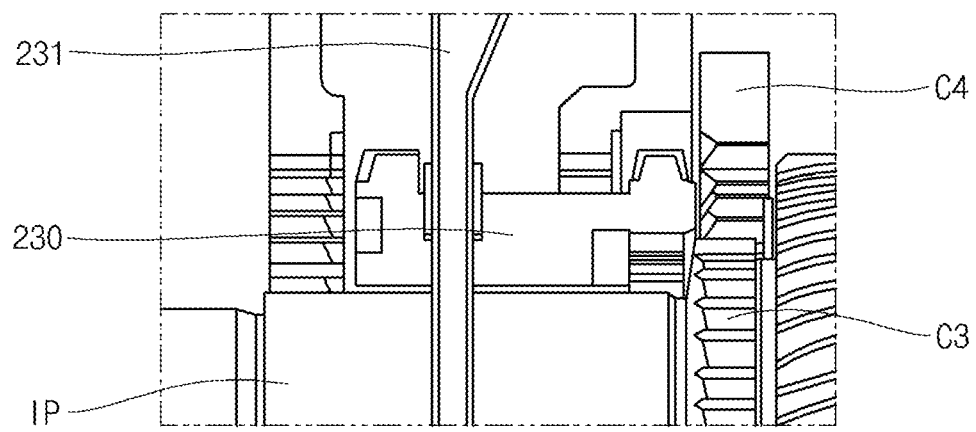

Meanwhile, in the low range mode shown in FIG. 4B, if a driver moves the sleeve 230 using the fork 231 to the left (of the drawing), the first clutch gear C-1 on the ring gear 213 is connected to the second clutch gear C-2 mounted on the housing 201. Since the ring gear 213 is fixed to the housing 201, it does not move. In addition, since the input shaft IP is connected to the sun gear 211, it does not move, either.

The input shaft IP is connected to the sun gear 211, which is connected to the carrier 215. Since the ring gear 213 is fixed to the housing 201, a slight speed reduction occurs between the input shaft IP and the output shaft IP.

Figure 6:
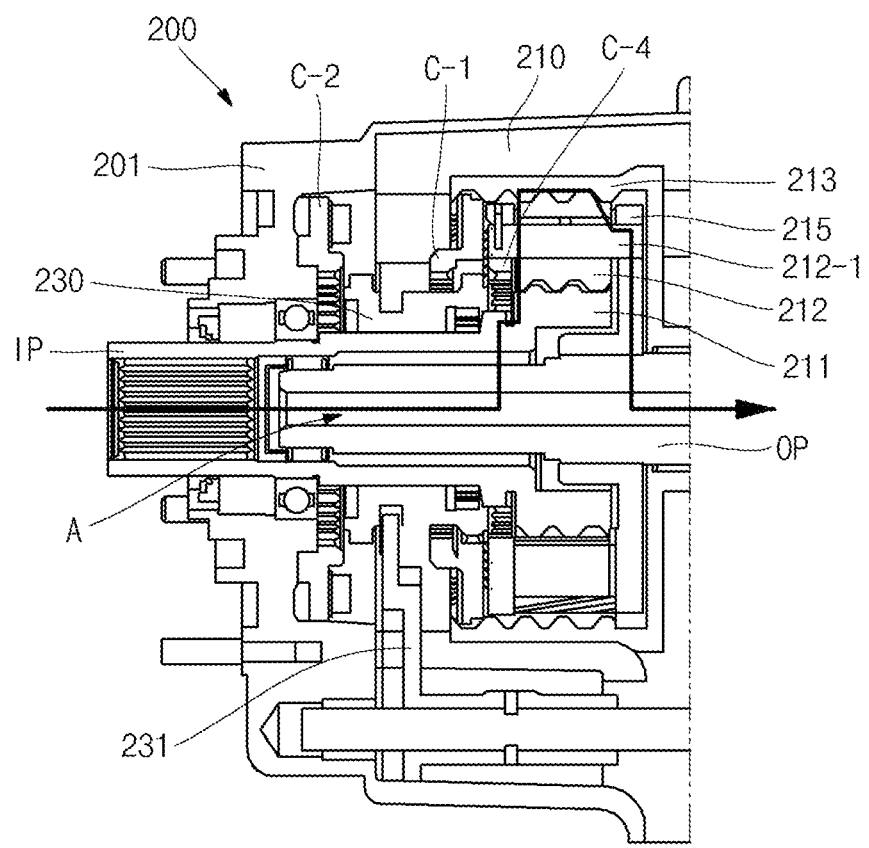
FIG. 6 illustrates the power transfer path in the low range mode according to the present invention shown in FIG. 4B.

The power transfer path, as indicated by the arrow, in the low range mode according to the present invention shown in FIG. 4B is illustrated in FIG. 6.

As described above, according to the present invention, in the high range mode, the planetary gear assembly system rotates with a shaft without gear rotation between the sun gear, the planetary gear assembly system and the ring gear. However, in the low range mode, the ring gear is fixed to a housing, and gear rotation occurs in the planetary gear assembly system. Since the low range mode infrequently occurs, the range shift mechanism maintains high efficiency and low noise conditions for the most part of operating time. In addition, since there is no gear rotation in the low range mode, a gear lubricating oil is required only in the low range mode. The power consumed by the lubricating oil of a general oil pump can be reduced. Therefore, the present invention is advantageous in view of high fuel efficiency and low noise.

Although the range shift system for transfer case according to an exemplary embodiment of the present invention has been described in detail hereinabove, it should be understood that many variations and modifications of the basic inventive concept herein described, which may appear to those skilled in the art, will still fall within the spirit and scope of the exemplary embodiments of the present invention as defined by the appended claims.

The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A range shift mechanism in the form of a floating planetary gear assembly for a transfer case, the range shift mechanism comprising:
    an input shaft providing a driving force to a sun gear, the sun gear having a clutch gear provided at one side portion of the sun gear to allow the sun gear to be connected with a carrier and integrated with the input shaft;
    an output shaft arranged coaxially with the input shaft and rotating independently of the input shaft;
    a carrier arranged coaxially with the sun gear, directly connected to the output shaft and having a clutch gear provided at one side portion of the carrier to allow the carrier be connected with the sun gear;
    a plurality of pinion gears radially installed on the carrier and meshed with the sun gear and a floating ring gear;
    the floating ring gear arranged coaxially with the output shaft, freely rotating on the output shaft in a coaxial direction and having a clutch gear provided at one side portion of the floating ring gear to allow the floating ring gear to be connected with a housing;
    a sleeve having a clutch gear to be connected with the sun gear, the floating ring gear and a housing clutch gear, axially sliding on the input shaft by a fork and having a circumferential groove to be connected with the fork; and
    a fork and a guide rail axially moving the sleeve.

2. The range shift mechanism of claim 1, wherein the planetary gear assembly system has a low range mode in which a gear ratio is 1.4:1 to 4.5:1.

3. The range shift mechanism of claim 1, wherein the floating ring gear is configured to be axially rotated on the output shaft, and is fixed to the input shaft and the output shaft in a high range mode and fixed to the housing in a low range mode.

4. The range shift mechanism of claim 1, wherein the sleeve controls connections between each of the sun gear, the ring gear and the housing, in the high range mode, the clutch gear installed on the sleeve connects the clutch gear installed on the sun gear and the clutch gear installed on the carrier, the planetary gear assembly system, including the sun gear, the pinion gears, the pinion shaft and the ring gear, are integrated into one single unit and rotate together, and in the low range mode, the clutch gear installed on the sleeve connects the housing clutch gear and the clutch gear installed on the ring gear, and ring gear rotation does not occur in a fixed state.

5. The range shift mechanism of claim 1, wherein the carrier is connected to the output shaft and includes a clutch carrier provided on one side portion of the carrier to enable smooth connection with the sun gear by the sleeve.

6. The range shift mechanism of claim 1, wherein the clutch gear installed on the sun gear to enable smooth connection with the carrier by the sleeve.

7. The range shift mechanism of claim 1, wherein the housing clutch gear is fixed to the housing to enable smooth connection with the ring gear by the sleeve in the low range mode.

8. The range shift mechanism of claim 2, wherein the floating ring gear is configured to be axially rotated on the output shaft, and is fixed to the input shaft and the output shaft in a high range mode and fixed to the housing in a low range mode.

9. The range shift mechanism of claim 2, wherein the sleeve controls connections between each of the sun gear, the ring gear and the housing, in the high range mode, the clutch gear installed on the sleeve connects the clutch gear installed on the sun gear and the clutch gear installed on the carrier, the planetary gear assembly system, including the sun gear, the pinion gears, the pinion shaft and the ring gear, are integrated into one single unit and rotate together, and in the low range mode, the clutch gear installed on the sleeve connects the housing clutch gear and the clutch gear installed on the ring gear, and ring gear rotation does not occur in a fixed state.

10. The range shift mechanism of claim 2, wherein the carrier is connected to the output shaft and includes a clutch carrier provided on one side portion of the carrier to enable smooth connection with the sun gear by the sleeve.

11. The range shift mechanism of claim 2, wherein the clutch gear installed on the sun gear to enable smooth connection with the carrier by the sleeve.

12. The range shift mechanism of claim 2, wherein the housing clutch gear is fixed to the housing to enable smooth connection with the ring gear by the sleeve in the low range mode.

13. A range shift mechanism:
   a planetary gear system comprises a sun gear, a pinion gear, a ring gear, a carrier, and a pinion gear shaft, the pinion gear is rotatably fixed to the carrier through the pinion gear shaft,
   an input shaft providing a driving force to the sun gear;
   an output shaft connected to the carrier;
   a first clutch gear installed on the ring gear;
   a second clutch gear installed on a housing;
   a third clutch gear installed on the input shaft;
   a fourth clutch gear installed on the carrier; and
   a sleeve installed on a circumferential portion of the input shaft, the sleeve slides on the input shaft and controls connections between each of the input shaft, the planetary gear assembly system and the housing;
   wherein the ring gear rotates with the input shaft and the output shaft.

14. The range shift mechanism of claim 13, wherein the planetary gear assembly system has a low range mode in which a gear ratio is 1.4:1 to 4.5:1.

15. The range shift mechanism of claim 13, wherein the ring gear is configured to be axially rotated on the output shaft, and is fixed to the input shaft and the output shaft in a high range mode and fixed to the housing in a low range mode.

16. The range shift mechanism of claim 14, wherein the ring gear is configured to be axially rotated on the output shaft, and is fixed to the input shaft and the output shaft in a high range mode and fixed to the housing in a low range mode.

* * * * *